(12) United States Patent
Eistein et al.

(10) Patent No.: US 12,107,708 B2
(45) Date of Patent: Oct. 1, 2024

(54) NOISE WHITENING MATRIX INDICATIONS

(71) Applicant: QUALCOMM Incorporated, San Diego, CA (US)

(72) Inventors: Yaniv Eistein, Tel Aviv (IL); Aviv Regev, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/160,268

(22) Filed: Jan. 26, 2023

(65) Prior Publication Data

US 2024/0259239 A1  Aug. 1, 2024

(51) Int. Cl.
*H04L 25/03* (2006.01)
*H04B 1/10* (2006.01)
*H04W 72/1273* (2023.01)

(52) U.S. Cl.
CPC ......... *H04L 25/03993* (2013.01); *H04B 1/10* (2013.01); *H04W 72/1273* (2013.01)

(58) Field of Classification Search
CPC . H04L 25/03993; H04B 1/10; H04W 72/1273
See application file for complete search history.

(56) References Cited

U.S. PATENT DOCUMENTS

2022/0294481 A1\* 9/2022 Pick ...................... H04W 72/21

OTHER PUBLICATIONS

R. Laroia, S. A. Tretter and N. Farvardin, "A simple and effective precoding scheme for noise whitening on intersymbol interference channels," in IEEE Transactions on Communications, vol. 41, No. 10, pp. 1460-1463, Oct. 1993, doi: 10.1109/26.237880 (Year: 1993).\*
Geoff Knagge, David Garrett, Sivarama Venkatesan, Chris Nicol, "Matrix Datapath Architecture for an Iterative 4×4 MIMO Noise Whitening Algorithm," GLSVLSI '03: Proceedings of the 13th ACM Great Lakes symposium on VLSI, Apr. 2003, pp. 153-156, https://doi.org/10.1145/764808.764848 (Year: 2003).\*

\* cited by examiner

*Primary Examiner* — Nader Bolourchi
(74) *Attorney, Agent, or Firm* — QUALCOMM Incorporated

(57) ABSTRACT

Various aspects of the present disclosure generally relate to wireless communication. In some aspects, a user equipment (UE) may transmit an indication of a noise whitening matrix associated with processing of received communications. The UE may receive data with precoding that is based at least in part on the noise whitening matrix. Numerous other aspects are described.

26 Claims, 9 Drawing Sheets

NOISE WHITENING MATRIX INDICATIONS

FIELD OF THE DISCLOSURE

Aspects of the present disclosure generally relate to wireless communication and to techniques and apparatuses for noise whitening matrix indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
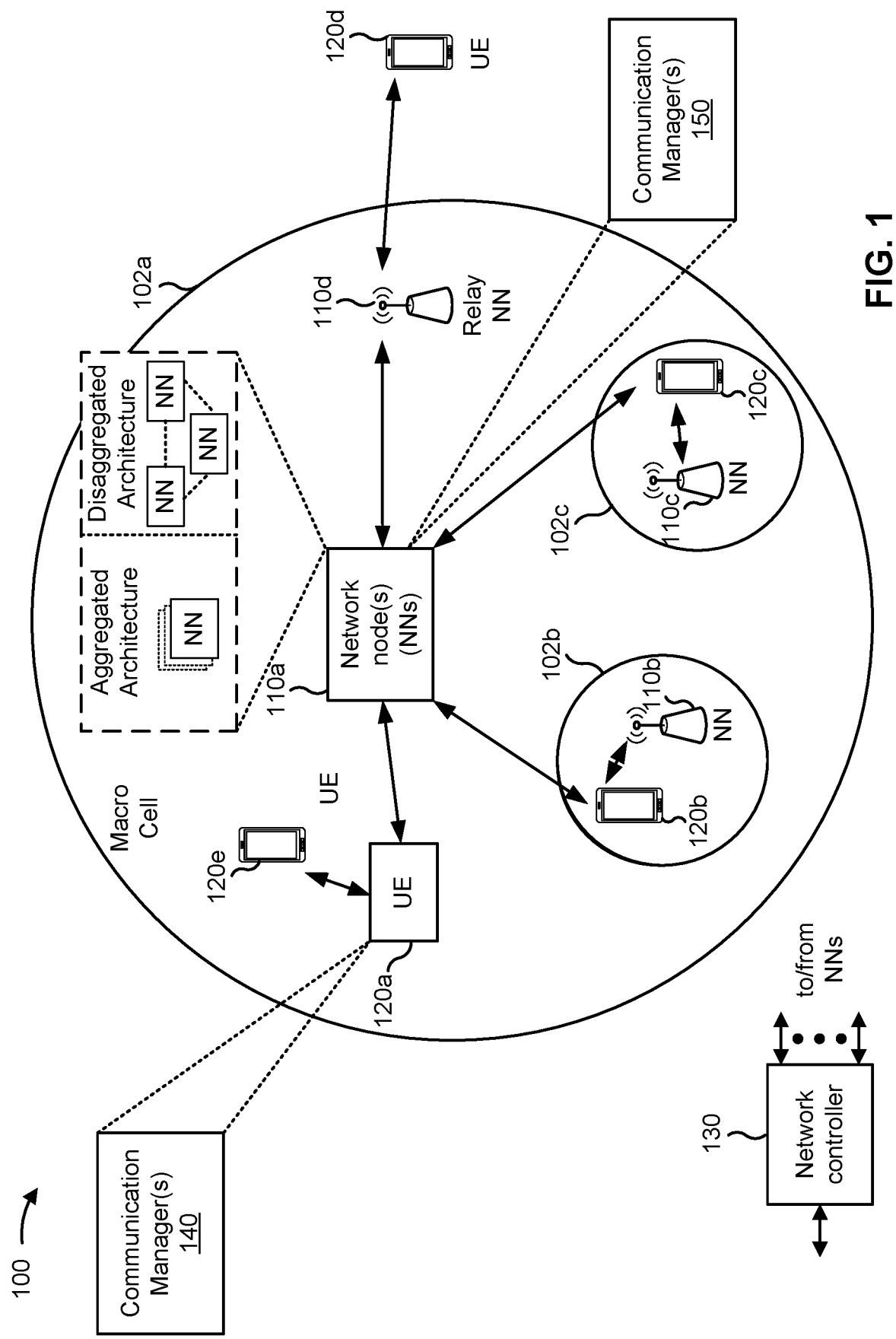
FIG. 1 is a diagram illustrating an example of a wireless network, in accordance with the present disclosure.

Some aspects described herein relate to a method of wireless communication performed by a user equipment (UE). The method may include transmitting an indication of a noise whitening matrix associated with processing of received communications. The method may include receiving data with precoding that is based at least in part on the noise whitening matrix.

Some aspects described herein relate to a method of wireless communication performed by a network node. The method may include receiving an indication of a noise whitening matrix associated with processing of received communications at a UE. The method may include transmitting data with precoding that is based at least in part on the noise whitening matrix.

Some aspects described herein relate to a UE for wireless communication. The user equipment may include a memory and one or more processors coupled to the memory. The one or more processors may be configured to transmit an indication of a noise whitening matrix associated with processing of received communications. The one or more processors may be configured to receive data with precoding that is based at least in part on the noise whitening matrix.

Some aspects described herein relate to a network node for wireless communication. The network node may include a memory and one or more processors coupled to the memory. The one or more processors may be configured to receive an indication of a noise whitening matrix associated with processing of received communications at a UE. The one or more processors may be configured to transmit data with precoding that is based at least in part on the noise whitening matrix.

Some aspects described herein relate to a non-transitory computer-readable medium that stores a set of instructions for wireless communication by a UE. The set of instructions, when executed by one or more processors of the UE, may cause the UE to transmit an indication of a noise whitening matrix associated with processing of received communications. The set of instructions, when executed by one or more processors of the UE, may cause the UE to receive data with precoding that is based at least in part on the noise whitening matrix.

Some aspects described herein relate to a non-transitory computer-readable medium that stores a set of instructions for wireless communication by a network node. The set of instructions, when executed by one or more processors of the network node, may cause the network node to receive an indication of a noise whitening matrix associated with processing of received communications at a UE. The set of instructions, when executed by one or more processors of the network node, may cause the network node to transmit data with precoding that is based at least in part on the noise whitening matrix.

Some aspects described herein relate to an apparatus for wireless communication. The apparatus may include means for transmitting an indication of a noise whitening matrix associated with processing of received communications. The apparatus may include means for receiving data with precoding that is based at least in part on the noise whitening matrix.

Some aspects described herein relate to an apparatus for wireless communication. The apparatus may include means for receiving an indication of a noise whitening matrix associated with processing of received communications at a UE. The apparatus may include means for transmitting data with precoding that is based at least in part on the noise whitening matrix.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Per survivor reduced complexity demodulation (PSRD) may be an alternative to maximum likelihood (ML) demodulation, with PSRD having a reduced complexity and consuming fewer computing and power resources of the UE. However, to use PSRD, QR decomposition is performed on a channel, which may consume computing and power resources of the UE. In this way, a benefit of conserving computing and power resources of the UE may be reduced.

In some aspects described herein, the UE and the network node may shift the QR decomposition associated with PSRD to the network node. In this way, the consumption of UE computing and power resources may be reduced. Based at least in part on the UE having power and processing constraints that are more limited than those of the network node, a network may operate with improved performance when the QR decomposition is performed at the network node.

In some aspects, the network node may perform QR decomposition based at least in part on an uplink communication with an assumption that an uplink channel is similar to, but not exactly the same as, a downlink channel. Relying on channel reciprocity between the uplink channel and the downlink channel may provide a coarse QR decomposition that may be sufficient in some scenarios. However, to improve and/or refine the QR decomposition, the UE and the network node may perform a refinement stage. For example, the UE may apply a Gaussian elimination algorithm on a communication received based at least in part on the coarse QR decomposition, and may transmit an indication of a correction matrix (also referred to as a refinement matrix) to the network node. This procedure, including the refinement stage, may consume fewer computing and power resources than a procedure in which the UE performs QR decomposition at the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a noise whitening matrix associated with processing of received communications; and receive data with precoding that is based at least in part on the noise whitening matrix. Additionally, or alternatively, the communication manager 140 may perform one or more other operations described herein.

In some aspects, the network node 110 may include a communication manager 150. As described in more detail elsewhere herein, the communication manager 150 may receive an indication of a noise whitening matrix associated with processing of received communications at a UE; and transmit data with precoding that is based at least in part on the noise whitening matrix. Additionally, or alternatively, the communication manager 150 may perform one or more other operations described herein.

As indicated above, FIG. 1 is provided as an example. Other examples may differ from what is described with regard to FIG. 1.

Figure 2:
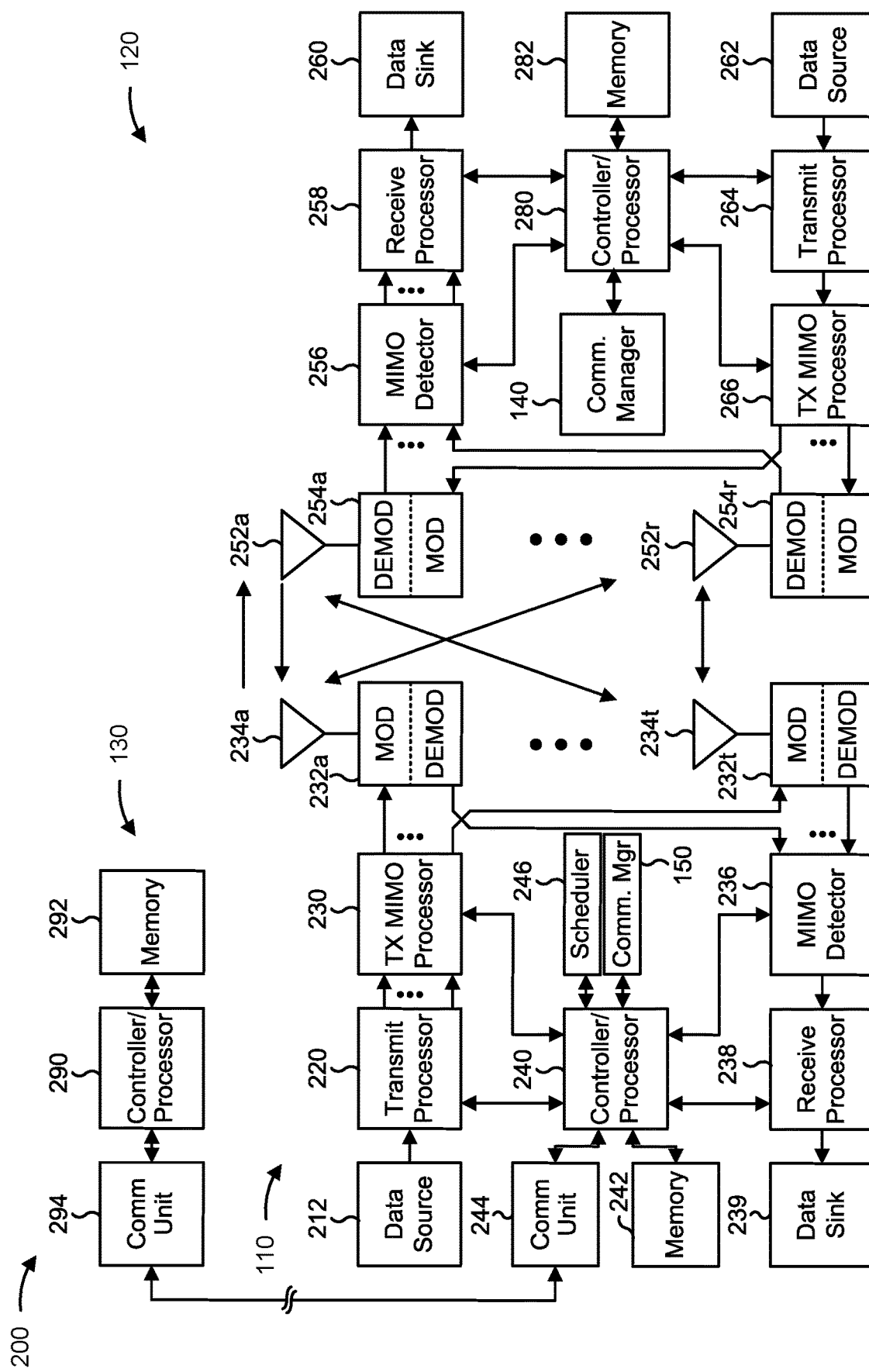
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with noise whitening matrix indications, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for transmitting an indication of a noise whitening matrix associated with processing of received communications; and/or means for receiving data with precoding that is based at least in part on the noise whitening matrix. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an indication of a noise whitening matrix associated with processing of received communications at a UE; and/or means for transmitting data with precoding that is based at least in part on the noise whitening matrix. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
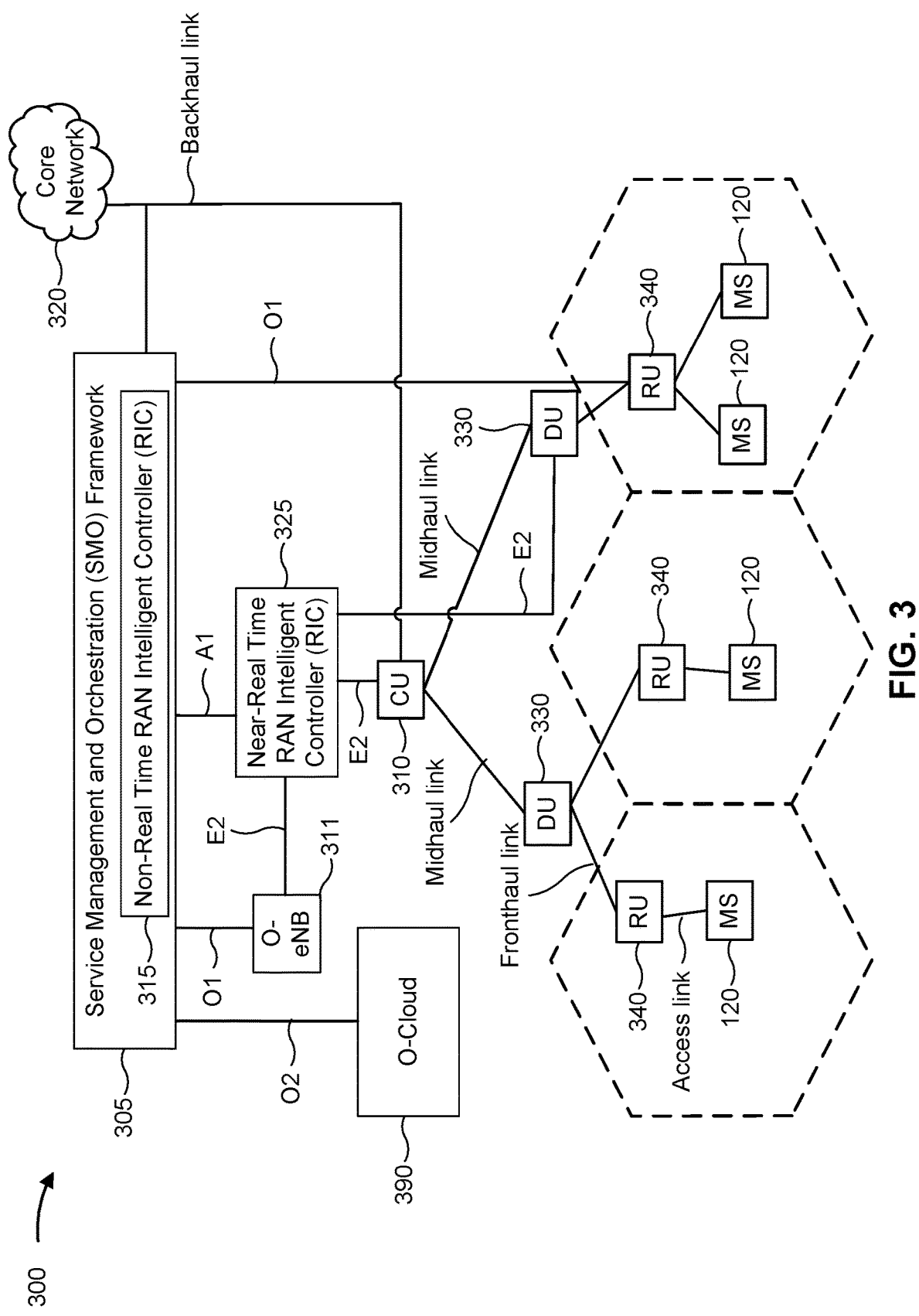
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
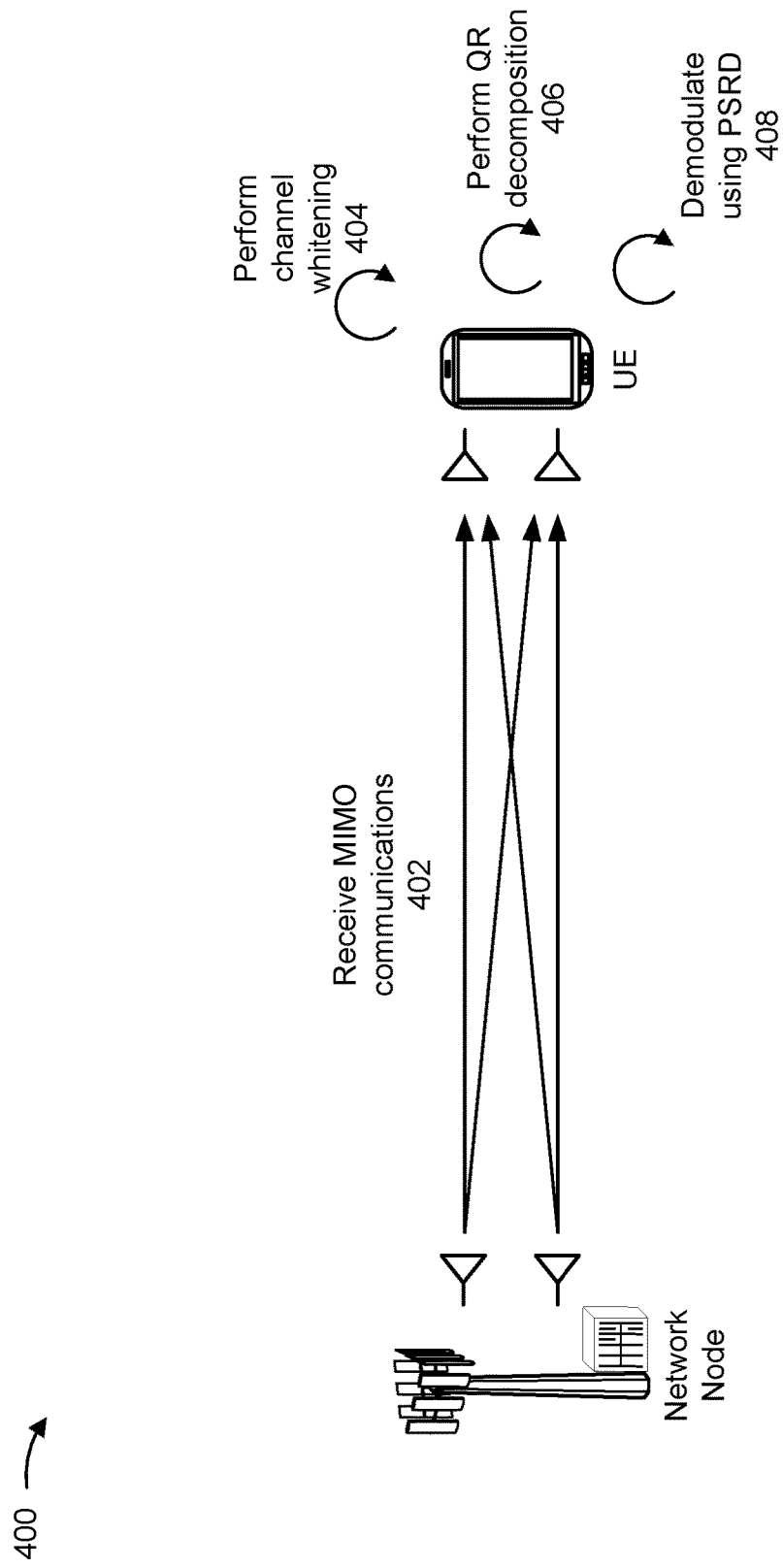
FIG. 4 is a diagram illustrating an example of multiple-input multiple-output (MIMO) communications from a network node to a UE in a wireless network, in accordance with the present disclosure.

FIG. 4 is a diagram illustrating an example 400 of MIMO communications from a network node to a UE in a wireless network, in accordance with the present disclosure. Example 400 shows two transmission antennas and two reception antennas, with a four layer communication. However, other examples may include additional or fewer transmission antennas of the network node and/or additional or fewer reception antennas of the UE.

Some UEs may perform PSRD to demodulate received MIMO communications. PSRD may be used as an alternative to ML demodulation based at least in part on ML demodulation having relatively high complexity and consuming a relatively high amount of computing resources as compared to PSRD. A PSRD algorithm has reduced complexity, compared to ML, based at least in part on the UE building a finite list of symbols search space over which log-likelihood ratios (LLRs) or hard decisions are calculated (e.g., to select a demodulation outcome for a signal of the received MIMO communications). For example, the UE may select a demodulation outcome from a reduced set of candidate outcomes based at least in part on a pre-stage calculation of QR decomposition (e.g., of a whitened channel of the received MIMO communication).

As shown by reference number 402, the UE may receive one or more MIMO communications from the network node. The MIMO communications may include a communication with multiple layers (e.g., spatial layers) that may include different data and/or redundancies for another layer.

As shown by reference number 404, the UE may perform channel whitening. Whitening may include reducing interfering signals from a channel response. For example, whitening may be used to subtract signals, from another communication device, in a same frequency band as an allocation for receiving a MIMO communication.

As shown by reference number 406, the UE may perform QR decomposition. The QR decomposition may include decomposing signals (e.g., a channel response) into an orthogonal matrix Q and an upper triangle matrix R that can be used to identify demodulated values (e.g., associated constellation points in an in-phase and quadrature (IQ) plane) of a received MIMO communication. However, building the finite list in the pre-stage calculation of QR decomposition may consume computing resources of the UE.

As shown by reference number 408, the UE may demodulate the one or more MIMO communications using PSRD. As discussed, using PSRD to demodulate the one or more MIMO communications may conserve computing resources of the UE relative to using ML demodulation.

As indicated above, FIG. 4 is provided as an example. Other examples may differ from what is described with regard to FIG. 4.

As described, PSRD demodulation may be an alternative to ML demodulation, with PSRD having a reduced complexity and consuming fewer computing and power resources of the UE. However, to use PSRD, QR decomposition is performed on a channel, which may consume computing and power resources of the UE. In this way, a benefit of conserving computing and power resources of the UE may be reduced.

In some aspects described herein, the UE and the network node may shift the QR decomposition associated with PSRD to the network node. In this way, the consumption of UE computing and power resources may be reduced. Based at least in part on the UE having power and processing constraints that are more limited than those of the network node, a network may operate with improved performance.

In some aspects, the network node may perform QR decomposition based at least in part on an uplink communication with an assumption that an uplink channel is similar to, but not exactly the same as, a downlink channel. Relying on channel reciprocity between the uplink channel and the downlink channel may provide a coarse QR decomposition that may be sufficient in some scenarios. However, to improve and/or refine the QR decomposition, the UE and the network node may perform a refinement stage. For example, the UE may apply a Gaussian elimination algorithm on a communication received based at least in part on the coarse QR decomposition, and may transmit an indication of a correction matrix (also referred to as a refinement matrix) to the network node. This procedure, including the refinement stage, may consume fewer computing and power resources than a procedure in which the UE performs QR decomposition at the UE.

In some aspects, the network node may perform a single QR decomposition to a channel H (rather than as done in other PSRD implementations where QR decomposition is performed on each layer of a communication having $N_{layers}$). The QR decomposition may include allocating (e.g., dynamically rather than with a fixed size) a search space of size $N_i$, from a search space size budget (e.g. N=256), per each layer based at least in part on estimation of an associated $SNR_i$. A product of sub-spaces search size may be confined within a budget: $\Pi_{i=1}^{N_{layers}} N_i \leq N$ or some (e.g., all or fewer than all) $N_i$ may be clipped so that the budget is satisfied.

In an example, a received signal y is expressed as y=Hx+n, where x is a transmitted signal and n is noise remaining post whitening. The device (e.g., the network node) may measure an energy of each column of H (e.g., indicating received power of each layer), with the measured energies expressed as $E_i = \|col(i, H)\|^2$. The device may sort the energies $E_i$ in descending order and construct in the same column order an associated permutated matrix $\tilde{H}$. This way, the last layer $\tilde{x}_{N_{layers}}$ has a signal-to-noise ratio (SNR) that is minimal, while the rest of SNRs of the layers are maximized. In some aspects, it may be preferable to place uncertainty on a layer of interest (e.g., the last layer) and to reduce error propagation to the rest of the layers.

The device may then perform a single QR decomposition for the resulting permutated matrix: $\tilde{H} = QR$. The device may minimize a metric:

$$\min_x \|y - \tilde{H}x\|^2,$$

where $y = \tilde{H}\tilde{x} + n$. This may also be expressed as:

$$\min_x \|\tilde{y} - Rx\|^2,$$

where $\tilde{y} = Q^H y$ and R is an upper triangular matrix. The estimated SNR per layer is a squared diagonal coefficient in R: $SNR_i = |R_{ii}|^2$, with the following matrix expression of $\tilde{y}$:

$$\tilde{y} = \begin{bmatrix} R_{11} & R_{12} & \ldots & R_{14} \\ 0 & R_{22} & \ldots & R_{24} \\ 0 & 0 & R_{33} & R_{3N_{layers}} \\ 0 & 0 & 0 & R_{N_{layers}N_{layers}} \end{bmatrix} \cdot \begin{bmatrix} x_1 \\ x_2 \\ \ldots \\ x_{N_{layers}} \end{bmatrix} + n$$

The device may then determine a search-space size per layer: $N_i = func(SNR_i)$. The device may build a list of candidate symbols (e.g., a search space) using a multi-step process, such as the following. The device may begin with the equation: $y_{N_{layers}} R_{N_{layers}N_{layers}} x_{N_{layers}} + n_{N_{layers}}$. The device may calculate a soft estimation (e.g., a coarse estimation) $\hat{x}_{N_{layers}} = y_{N_{layers}}/R_{N_{layers}N_{layers}}$ and then apply hard decision to achieve a result of $HD(\hat{x}_{N_{layers}})$. The device may take Ni neighbors surrounding $HD(\hat{x}_{N_{layers}})$, where Ni is the search space size for the i-th layer. Ni may not be a fixed value (e.g. not fixated to 36), and may be dynamically adapted based at least in part on SNRi (SNR of the i-th layer) as described before. The device may perform this procedure for remaining layers.

The device may substitute all (e.g. Ni) candidate hard decisions values of $\hat{x}_{Nlayers}$ into:

$$\tilde{y} = \begin{bmatrix} R_{11} & R_{12} & \ldots & R_{14} \\ 0 & R_{22} & \ldots & R_{24} \\ 0 & 0 & R_{33} & R_{3N_{layers}} \\ 0 & 0 & 0 & R_{N_{layers}N_{layers}} \end{bmatrix} \cdot \begin{bmatrix} x_1 \\ x_2 \\ \ldots \\ x_{N_{layers}} \end{bmatrix} + n$$

and solve the equation and then apply hard decision to the result. The device may then allocate Ni neighbors as the surrounding search space around this hard decision (different from other PSRD techniques where the search space is limited to 1 rather than Ni).

The device may repeat the above substitution, equation solving, and hard decision until reaching to the 1$^{st}$ layer in $x_{perm}$. After repeating these steps, the device will have built the search list for all layers (e.g., as a single list). The search list will contain N sequences of candidates: list=$\{(N_{j=1}$ values for value for 1$^{st}$ layer, Ni values for ith layer, ..., $N_{i=Nlayers}$ values for last layer)$\}$, where the search space budget is: $\Pi_{i=1}^{Nlayers} N_i \leq N$.

This procedure concludes with a list using just one round of QR decomposition, which is different from other PSRD decomposition procedures that apply $N_{layer}$ costly rounds.

The device may calculate LLRs per each bit, with the LLR calculation for any bit belonging to any layer benefiting by using a single unified search space list. The LLRs may be described as the output of an improved efficiency single QR PSRD:

$$LLR_{bit} = \frac{1}{noise\_power}\left(\min_{x_{perm} \in \{list|bit=0\}}\|\tilde{y} - Rx_{perm}\|^2 - \min_{x_{perm} \in \{list|bit=1\}}\|\tilde{y} - Rx_{perm}\|^2\right)$$

In the LLR formula, there is only one list of candidates (e.g., not a list per every permutation), there is only one R matrix since based at least in part having only one permutation, and there is only one corresponding QR decomposition.

Reciprocity is an assumption that an uplink physical channel and a downlink physical channels have the following connection: $H_D = (H_U)^T$. This assumption is not perfect and has inaccuracies based at least in part on different RF chains between downlink and uplink channels, downlink and uplink being on different frequencies with different physical channels (e.g., in frequency-division duplexing (FDD) communications), and/or reciprocity working only under certain conditions in reconfigurable intelligent surfaces (RIS) assisted time-division duplexing (TDD) wireless networks.

For these reasons, calculations may be improved by assume that $H_D$ is close to $(H_U)^T$, and not equal. Accounting for inequality may be important for PSRD operation.

In some aspects, a network node may request the UE to share its noise covariance whitening matrix $W_N$. The UE may estimate its received signal noise covariance matrix $C_N$ and then derive a spatially whitening matrix $W_N$. The UE may send $W_N$ over the uplink channel to the network node. The network node may estimate the uplink physical channel $H_U$ (e.g., using an uplink precoder that is known to the network node). The network node may calculate the RQ decomposition of $(W_N \cdot H_U)$ (e.g., using the reciprocity trait of the uplink and downlink channels, $H_U$ being close to $H_D$ and not necessarily equal). The network node may inform the UE of an upcoming change in the data precoding matrix. This indicates to the UE that its own QR decomposition in the receiver is unnecessary.

The network node uses $Q^H$ to precode data for a subsequent communication. The UE estimates the channel to be a "close to diagonal matrix" based at least in part on the precoding using $H_U$ for a downlink communication. Using Gaussian elimination, the UE may calculate a correction matrix V (also referred to as a refinement matrix) needed to make a triangular matrix. The UE transmits an indication of the matrix V to the network node, which then uses $Q^H V$ to precode subsequent data. With the $Q^H V$ used for precoding, the channel may be received as an upper triangular matrix, and PSRD performance is improved. The UE may demodulate the subsequent data based at least in part on the channel being received as the upper triangular matrix. Additionally, or alternatively, the UE may perform channel whitening on the subsequent data.

In another example, the UE estimates a downlink channel noise covariance, and a corresponding whitening matrix $W_N$ and sends an indication of $W_N$ to the network node. The network node precodes upcoming scheduled data slots using a matrix $Q^H$, where Q is derived from an QR decomposition of $(W_N \cdot H_U)$. The UE whitens a received slot using $W_N$ and estimates an equivalent downlink channel (e.g., the downlink physical channel $H_U$ with precoding applied). The equivalent downlink channel will be an upper "close to triangular" matrix $\tilde{R}$, based at least in part on $H_U$ that was used for the QR decomposition being close to but not equal to the downlink channel ($H_D$).

The UE may apply Gaussian elimination to triangulate $\tilde{R}$ matrix (e.g., from the right side of the matrix). This includes finding a matrix V such that $R=\tilde{R}V$, where R is perfectly upper triangular. In this example, Q is a Hermitian matrix, $Q^H V$ is not a Hermitian matrix, V is close to diagonal, and $Q^H V$ is close to Hermitian.

The UE provides an indication of V to the network node, and the network node precodes upcoming scheduled data slots using the refined precoding matrix $Q^H V$. The UE may again whiten the received physical downlink shared channel (PDSCH) of the upcoming scheduled data slots using the same $W_N$, and may estimate an equivalent downlink channel (e.g., the downlink physical channel with precoding). The equivalent downlink channel will now be the upper triangular matrix R. When the network node sends another request from the UE for an updated noise whitening matrix, then this precoding in the network node may be refreshed.

In some aspects, the UE may perform any number of whitening procedures. For example, $W_N$ extraction may include one or more of the following procedures and/or steps:

The UE may receive a signal Y (with a general precoder), which may be expressed as: $Y=H_D Ps+N$, where $H_D$ is the physical downlink channel, P is the precoder, s is the data symbols, and N is the noise. Additionally, or alternatively, $E(NN^H) \equiv C_N$, where E is a mean operator and C is a noise covariance.

The UE may spatially whiten noise by multiplying the received signal Y by a matrix $W_N$ such that $\tilde{N}=W_N N$ and $E(\tilde{N}\tilde{N}^H)=I$. Such a matrix $W_N$ may be found using Cholesky decomposition of $C_N$, among other examples.

QR decomposition (which is intended herein to include RQ decomposition) is a decomposition technique that may be used to decompose $(W_N \cdot H_U)$. The network node may perform QR decomposition using Gram-Shmidt orthogonalization of the rows of a matrix $(W_N \cdot H_U)$ starting from the last row of matrix. Using this decomposition, the network node may obtain $W_N H_U=RQ$, where R is upper triangular, and Q is Hermitian ($Q^H Q=QQ^H=I$).

The UE may Apply the precoder $Q^H$ over the sent data with a precoder of $\tilde{P} \equiv Q^H$. $\tilde{Y}=W_N Y=W_N H_D \tilde{P}s + W_N N=W_N H_D Q^H s + \tilde{N}=\tilde{R}s+\tilde{N}$, where $\tilde{R}$ is close to upper triangular, and $\tilde{N}$ is spatially white noise. If $H_D=H_U$ then $W_N H_D Q^H = W_N H_U Q^H = RQQ^H = R$, which would result in a perfect upper triangular matrix (e.g., $\tilde{R}=R$).

The network node may apply $Q^H V$ over the subsequent data (e.g., assuming: $\tilde{R}V=R$) using a new precoder $\tilde{P} \equiv Q^H V$. $\tilde{Y}=W_N Y=W_N H_D \tilde{P}s + W_N N=W_N H_D(Q^H V)s + \tilde{N}=\tilde{R}Vs+\tilde{N}=Rs+\tilde{N}$, where R is upper triangular, and $\tilde{N}$ is the spatially white noise.

Gaussian elimination use in refinement may be used to account for reciprocity inaccuracy as discussed herein. Gaussian elimination is an algorithm used for solving a system of linear equations. For a given square matrix K, the algorithm can find a matrix V such that $KV=R$ and R is upper triangular. This algorithm conserves computing and power resources compared to QR decomposition, though the matrix V is not necessarily Hermitian (e.g., as opposed to the matrix Q from QR decomposition). The algorithm can be applied on the rows or columns (as used by the UE in the described procedure) of K (this means multiplication from the left or from the right, respectively). The algorithm involves applying successive linear operations on the columns of K, until it becomes upper triangular. The linear operations may include swapping positions of two columns, multiplying a column by a non-zero scalar, and/or adding to one column a scalar multiple of another. Each of these operations can be represented by a matrix multiplying the matrix K from the right. Successive operations may be represented by successive multiplications. So, if $V_1$, $V_2$, $V_3$ operations (in that order) were needed to triangulate K, then $V=V_1 \cdot V_2 \cdot V_3$.

Figure 5:
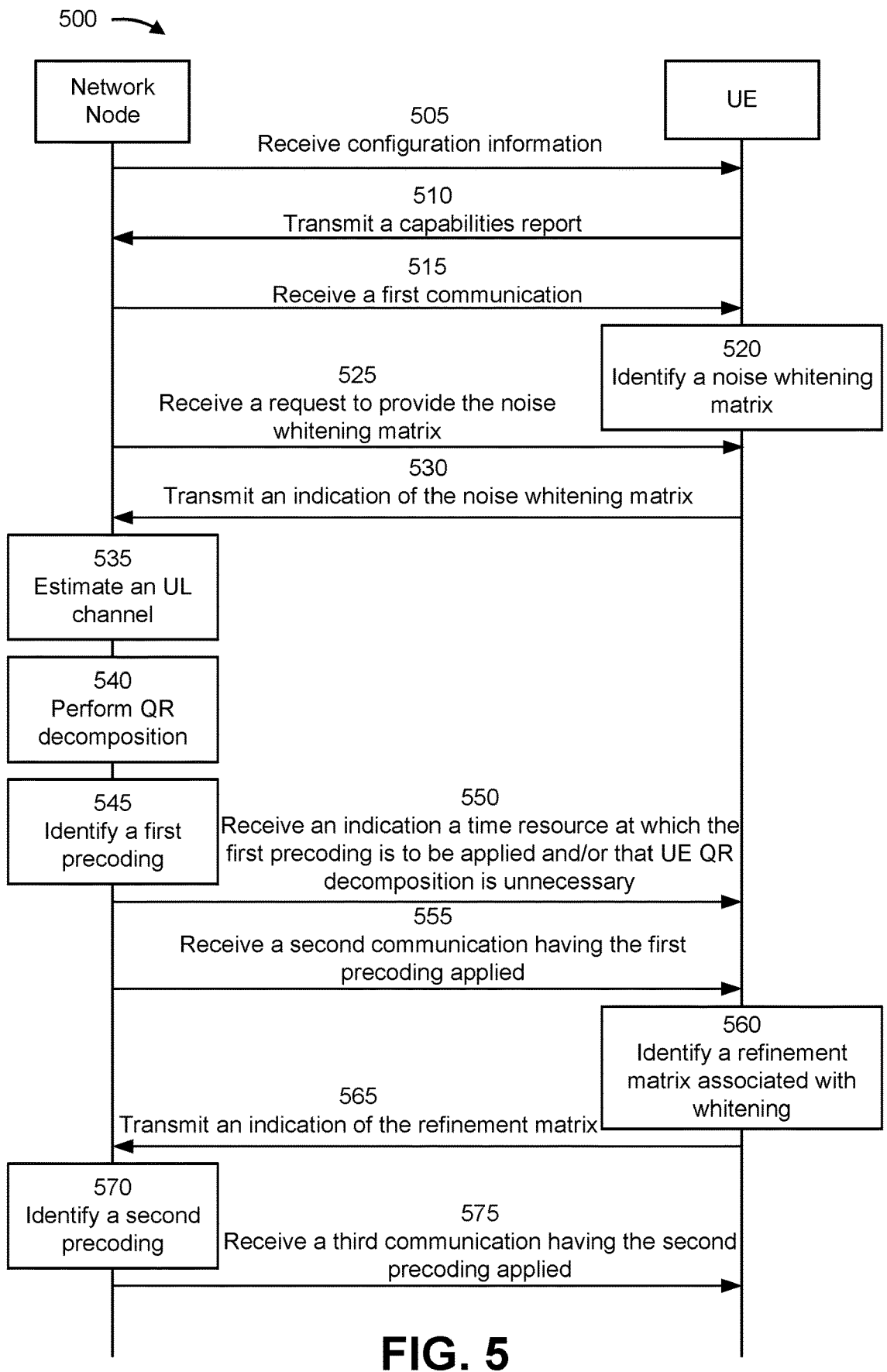
FIG. 5 is a diagram of an example associated with noise whitening matrix indications, in accordance with the present disclosure.

FIG. 5 is a diagram of an example 500 associated with noise whitening matrix indications, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to is to provide a noise whitening matrix to the network node. In some aspects, the configuration may indicate a message type and/or bit field to use for providing the noise whitening matrix to the network node. In some aspects, the configuration information may indicate that the UE is to provide the noise whitening matrix based at least in part on a request from the network node, a periodic resource for transmitting the noise whitening matrix (e.g., a channel state information (CSI) report resource), or satisfaction of a trigger condition at the UE, among other examples. The trigger condition may include a change in channel conditions, a beam selection, and/or cell reselection, among other examples, that may affect a channel response.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for noise whitening, reporting a noise whitening matrix, and/or identifying a refinement matrix associated with QR decomposition at the network node, among other examples.

As shown by reference number 515, the UE may receive, and the network node may transmit, a first communication. In some aspects, the first communication may include CSI reference signals (CSI-RSs), a data communication (e.g., on a PDSCH), and/or a tracking reference signal, among other examples.

As shown by reference number 520, the UE may identify a noise whitening matrix associated with reduction of noise during reception of the first communication. In some aspects, the UE may obtain the noise whitening matrix based at least in part on a procedure described herein (e.g., using a Cholesky decomposition) or another procedure. In some aspects, the noise whitening matrix is associated with processing the first communication.

As shown by reference number 525, the UE may receive, and the network node may transmit, a request to provide the noise whitening matrix. In some aspects, the request may include an aperiodic request that indicates a resource for transmitting an indication of the noise whitening matrix. Alternatively, the request may indicate periodic resources for periodically transmitting indications and/or updates to the noise whitening matrix.

As shown by reference number 530, the UE may transmit, and the network node may receive, an indication of the noise whitening matrix. In some aspects, the UE may transmit an explicit indication of values of the noise whitening matrix. In some aspects, the UE may transmit an implied indication of the values of the noise whitening matrix. For example, the UE may imply the indication of one or more of the values of the noise whitening matrix based at least in part on indications of relative values (e.g., relative to one or more explicit values of the noise whitening matrix). In some aspects, the UE may transmit an indication of approximate values or rounded values of the noise whitening matrix. For example, the values may have a granularity that is based at least in part on, for example, a configured granularity as indicated by the network node or in a communication protocol, among other examples.

The UE may transmit the indication of the noise whitening matrix based at least in part on receiving the request described in connection with reference number 525 or independently from (e.g., in absence of) receiving the request described in connection with reference number 525 based at least in part on a configuration indicating to receive the indication of the noise whitening matrix (e.g., a configured periodic resource, a configuration to provide the indication within another report, such as a CSI report, and/or a configured trigger condition, among other examples).

As shown by reference number 535, the network node may estimate an uplink channel. In some aspects, the network node may estimate the uplink channel based at least in part on reception of the indication of the noise whitening matrix. In some aspects, the UE may estimate the uplink channel using a different communication, such as a data channel communication and/or an uplink reference signal (e.g., sounding reference signal (SRS)).

As shown by reference number 540, the network node may perform QR decomposition based at least in part on the uplink channel and/or the noise whitening matrix. In some aspects, the network node may use a QR decomposition process described herein or another QR decomposition process.

As shown by reference number 545, the network node may identify a first precoding used to transmit a second communication. The precoding may be based at least in part on the QR decomposition, the estimation of the uplink channel, and/or the noise whitening matrix, among other examples. In some aspects, the first precoding may be considered a coarse precoding based at least in part on using an uplink channel instead of a downlink channel for QR decomposition.

As shown by reference number 550, the UE may receive, and the network node may transmit, an indication a time resource at which the first precoding is to be applied and/or that UE QR decomposition is unnecessary. In some aspects, transmission of the indication of the time resource is an implicit indication that UE QR decomposition is unnecessary.

As shown by reference number 555, the UE may receive, and the network node may transmit, a second communication having the first precoding applied.

As shown by reference number 560, the UE may identify a refinement matrix associated with whitening. The UE may identify and/or obtain the refinement matrix based at least in part on identifying the refinement matrix as producing a triangular matrix when multiplied with an equivalent (e.g., estimated based at least in part on uplink channel) downlink channel response matrix associated with data of the second communication. The equivalent downlink channel response matrix is produced by application of the noise whitening matrix to the data (e.g., estimated channel after multiplying the channel response with the whitening matrix).

In some aspects, the UE may use Gaussian elimination to identify reciprocity inaccuracy. In this way, the UE may identify the refinement matrix as producing an upper triangular matrix from the channel response.

As shown by reference number 565, the UE may transmit, and the network node may receive, an indication of the refinement matrix. In some aspects, the UE may transmit an explicit indication of values of the refinement matrix. In some aspects, the UE may transmit an implied indication of the values of the refinement matrix. For example, the UE may imply the indication of one or more of the values of the refinement matrix based at least in part on indications of relative values (e.g., relative to one or more explicit values of the refinement matrix). In some aspects, the ULE may transmit an indication of approximate values or rounded values of the refinement matrix. For example, the values may have a granularity that is based at least in part on, for example, a configured granularity as indicated by the network node or in a communication protocol, among other examples.

As shown by reference number 570, the network node may identify a second precoding. The second precoding may be considered a refined precoding that is refined relative to the first precoding (e.g., based at least in part on the first precoding being based at least in part on the uplink channel). In some aspects, the second precoding may be based at least in part on the first precoding and the refinement matrix (e.g., $Q^H V$ as described herein, where V is the refinement matrix and $Q^H$ based at least in part on QR or RQ decomposition of $W_N \cdot H_U$).

As shown by reference number 575, the UE may receive, and the network node may transmit, a third communication having the second precoding applied. In some aspects, the UE may receive the third communication as an upper triangular matrix of the channel response based at least in part on the network node using the second precoding. In some aspects, the UE may apply the noise whitening matrix to the third communication and/or may estimate a downlink channel to be used to receive the third communication.

In some aspects, before transmitting the third communication, the network node may transmit an indication a time resource at which the second precoding is to be applied.

In some aspects, one or more operations described in connection with reference numbers 515-575 may be repeated when precoding is to be updated. For example, the UE may receive a request to transmit an updated noise whitening matrix or may transmit a request to update the noise whitening matrix. The UE and the network node may perform the one or more operations to identify an update to the noise whitening matrix, the QR decomposition, the first precoding, the refinement matrix, and/or the second precoding, among other examples. In some aspects, the UE or the network node may request to update the noise whitening matrix and/or the precoding for subsequent communications based at least in part on a change (e.g., by an amount that satisfies a threshold) of channel conditions, Doppler metrics, and/or power or computing resources available to the UE, among other examples.

Based at least in part on the network node performing QR decomposition, the UE may conserve computing and power resources that may have otherwise been consumed by performing QR decomposition at the UE.

As indicated above, FIG. 5 is provided as an example. Other examples may differ from what is described with respect to FIG. 5.

Figure 6:
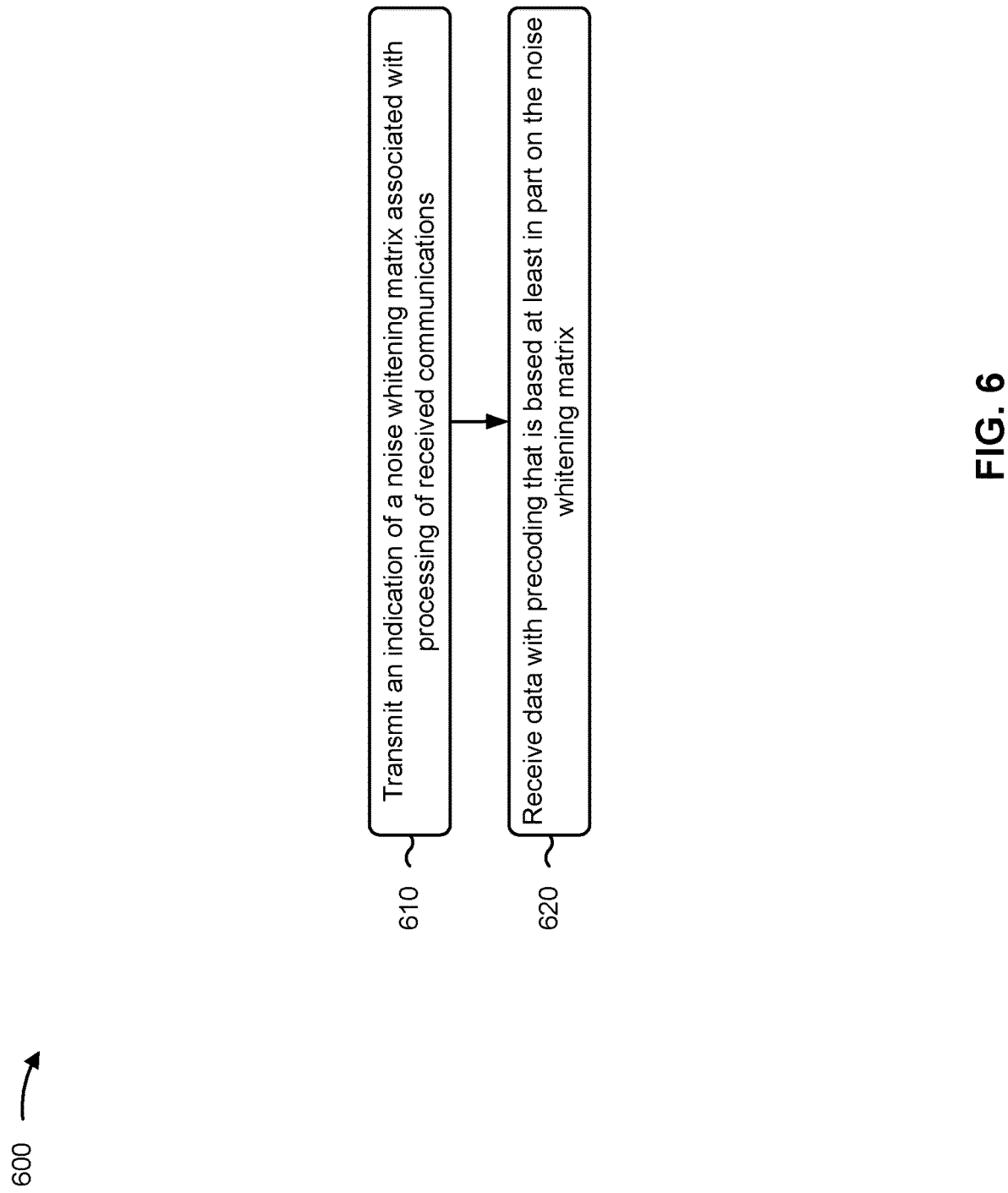
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with noise whitening matrix indications.

As shown in FIG. 6, in some aspects, process 600 may include transmitting an indication of a noise whitening matrix associated with processing of received communications (block 610). For example, the UE (e.g., using transmission component 804 and/or communication manager 806, depicted in FIG. 8) may transmit an indication of a noise whitening matrix associated with processing of received communications, as described above.

As further shown in FIG. 6, in some aspects, process 600 may include receiving data with precoding that is based at least in part on the noise whitening matrix (block 620). For example, the UE (e.g., using reception component 802 and/or communication manager 806, depicted in FIG. 8) may receive data with precoding that is based at least in part on the noise whitening matrix, as described above.

Process 600 may include additional aspects, such as any single aspect or any combination of aspects described below and/or in connection with one or more other processes described elsewhere herein.

In a first aspect, the noise whitening matrix is based at least in part on noise estimation of a downlink communication received before transmitting the indication of the noise whitening matrix.

In a second aspect, alone or in combination with the first aspect, process 600 includes receiving a request to provide the noise whitening matrix, wherein transmitting the indication of the noise whitening matrix is based at least in part on receiving the request to provide the noise whitening matrix.

In a third aspect, alone or in combination with one or more of the first and second aspects, process 600 includes transmitting a refinement matrix associated with a refinement of the precoding.

In a fourth aspect, alone or in combination with one or more of the first through third aspects, process 600 includes obtaining the refinement matrix based at least in part on identifying the refinement matrix as producing a triangular matrix when multiplied with an equivalent downlink channel response matrix associated with the data.

In a fifth aspect, alone or in combination with one or more of the first through fourth aspects, the equivalent downlink channel response matrix is produced by application of the noise whitening matrix to the data.

In a sixth aspect, alone or in combination with one or more of the first through fifth aspects, process 600 includes receiving additional data with additional precoding that is based at least in part on the refinement matrix.

In a seventh aspect, alone or in combination with one or more of the first through sixth aspects, process 600 includes applying the noise whitening matrix to the additional data, and estimating a downlink channel to be used to receive the additional data.

In an eighth aspect, alone or in combination with one or more of the first through seventh aspects, process 600 includes receiving a first request to transmit an updated noise whitening matrix, or transmitting a second request to update the noise whitening matrix.

In a ninth aspect, alone or in combination with one or more of the first through eighth aspects, receiving the first request or transmitting the second request is based at least in part on one or more of a change of channel conditions, a change in Doppler metrics, or a change in power or computing resources available to the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with noise whitening matrix indications.

As shown in FIG. 7, in some aspects, process 700 may include receiving an indication of a noise whitening matrix associated with processing of received communications at a UE (block 710). For example, the network node (e.g., using reception component 902 and/or communication manager 906, depicted in FIG. 9) may receive an indication of a noise whitening matrix associated with processing of received communications at a UE, as described above.

As further shown in FIG. 7, in some aspects, process 700 may include transmitting data with precoding that is based at least in part on the noise whitening matrix (block 720). For example, the network node (e.g., using transmission component 904 and/or communication manager 906, depicted in FIG. 9) may transmit data with precoding that is based at least in part on the noise whitening matrix, as described above.

Process 700 may include additional aspects, such as any single aspect or any combination of aspects described below and/or in connection with one or more other processes described elsewhere herein.

In a first aspect, the noise whitening matrix is based at least in part on noise estimation of a downlink communication transmitted by the network node before receiving the indication of the noise whitening matrix.

In a second aspect, alone or in combination with the first aspect, process 700 includes transmitting a request to provide the noise whitening matrix, wherein receiving the indication of the noise whitening matrix is based at least in part on transmitting the request to provide the noise whitening matrix.

In a third aspect, alone or in combination with one or more of the first and second aspects, process 700 includes receiving a refinement matrix associated with a refinement of the precoding.

In a fourth aspect, alone or in combination with one or more of the first through third aspects, the refinement matrix produces a triangular matrix when multiplied with an equivalent downlink channel response matrix associated with the data at the UE.

In a fifth aspect, alone or in combination with one or more of the first through fourth aspects, the equivalent downlink channel response matrix is produced by application of the noise whitening matrix to the data.

In a sixth aspect, alone or in combination with one or more of the first through fifth aspects, process 700 includes transmitting additional data with additional precoding that is based at least in part on the refinement matrix.

In a seventh aspect, alone or in combination with one or more of the first through sixth aspects, process 700 includes receiving a first request to transmit an updated noise whitening matrix, or transmitting a second request to update the noise whitening matrix.

In an eighth aspect, alone or in combination with one or more of the first through seventh aspects, receiving the first request or transmitting the second request is based at least in part on one or more of a change of channel conditions, a change in Doppler metrics, or a change in power or computing resources available to the UE.

In a ninth aspect, alone or in combination with one or more of the first through eighth aspects, the precoding is based at least in part on performing RQ decomposition using an uplink channel estimation and the noise whitening matrix.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
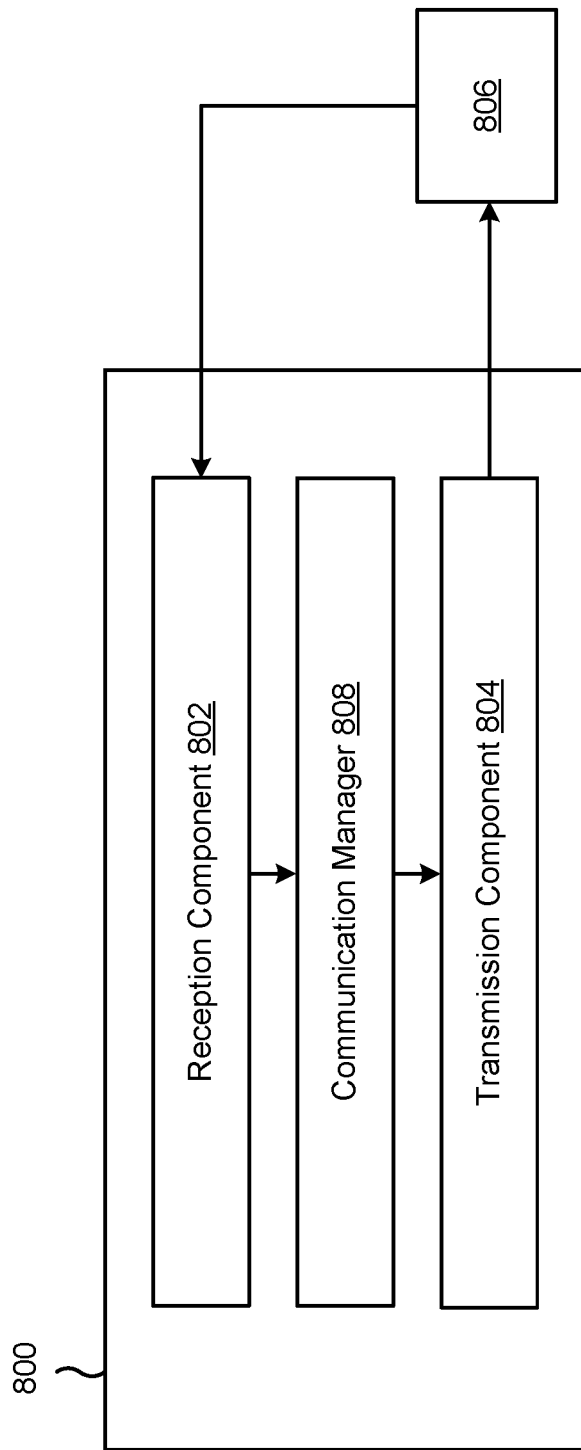
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory.

For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the ULE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit an indication of a noise whitening matrix associated with processing of received communications. The reception component 802 may receive data with precoding that is based at least in part on the noise whitening matrix.

The reception component 802 may receive a request to provide the noise whitening matrix wherein transmitting the indication of the noise whitening matrix is based at least in part on receiving the request to provide the noise whitening matrix.

The transmission component 804 may transmit a refinement matrix associated with a refinement of the precoding.

The reception component 802 may obtain the refinement matrix based at least in part on identifying the refinement matrix as producing a triangular matrix when multiplied with an equivalent downlink channel response matrix associated with the data.

The reception component 802 may receive additional data with additional precoding that is based at least in part on the refinement matrix.

The communication manager 806 may apply the noise whitening matrix to the additional data.

The communication manager 806 may estimate a downlink channel to be used to receive the additional data.

The reception component 802 may receive a first request to transmit an updated noise whitening matrix.

The transmission component 804 may transmit a second request to update the noise whitening matrix.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
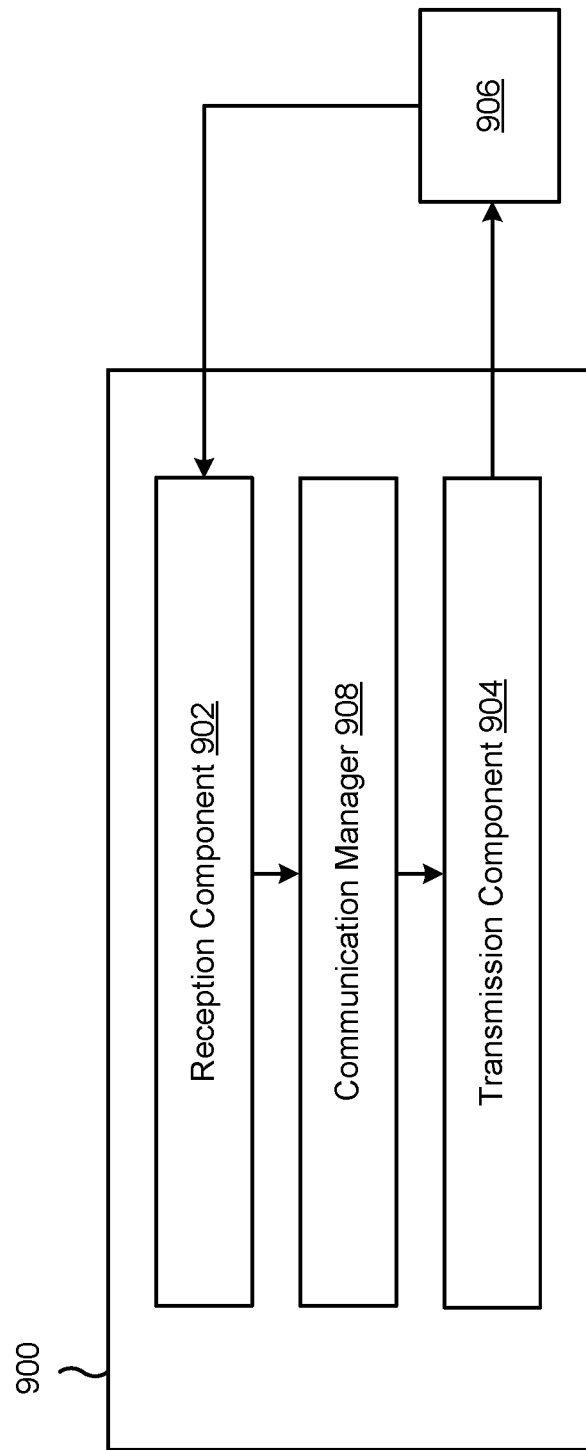
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive an indication of a noise whitening matrix associated with processing of received communications at a UE. The transmission component 904 may transmit data with precoding that is based at least in part on the noise whitening matrix.

The transmission component 904 may transmit a request to provide the noise whitening matrix wherein receiving the indication of the noise whitening matrix is based at least in part on transmitting the request to provide the noise whitening matrix.

The reception component 902 may receive a refinement matrix associated with a refinement of the precoding.

The transmission component 904 may transmit additional data with additional precoding that is based at least in part on the refinement matrix.

The reception component 902 may receive a first request to transmit an updated noise whitening matrix.

The transmission component 904 may transmit a second request to update the noise whitening matrix.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting an indication of a noise whitening matrix associated with processing of received communications; and receiving data with precoding that is based at least in part on the noise whitening matrix.

Aspect 2: The method of Aspect 1, wherein the noise whitening matrix is based at least in part on noise estimation of a downlink communication received before transmitting the indication of the noise whitening matrix.

Aspect 3: The method of any of Aspects 1-2, further comprising receiving a request to provide the noise whitening matrix, wherein transmitting the indication of the noise whitening matrix is based at least in part on receiving the request to provide the noise whitening matrix.

Aspect 4: The method of any of Aspects 1-3, further comprising transmitting a refinement matrix associated with a refinement of the precoding.

Aspect 5: The method of Aspect 4, further comprising: obtaining the refinement matrix based at least in part on identifying the refinement matrix as producing a triangular matrix when multiplied with an equivalent downlink channel response matrix associated with the data.

Aspect 6: The method of Aspect 5, wherein the equivalent downlink channel response matrix is produced by application of the noise whitening matrix to the data.

Aspect 7: The method of Aspect 4, further comprising: receiving additional data with additional precoding that is based at least in part on the refinement matrix.

Aspect 8: The method of Aspect 7, further comprising: applying the noise whitening matrix to the additional data; and estimating a downlink channel to be used to receive the additional data.

Aspect 9: The method of any of Aspects 1-8, further comprising: receiving a first request to transmit an updated noise whitening matrix; or transmitting a second request to update the noise whitening matrix.

Aspect 10: The method of Aspect 9, wherein receiving the first request or transmitting the second request is based at least in part on one or more of: a change of channel conditions, a change in Doppler metrics, or a change in power or computing resources available to the UE.

Aspect 11: A method of wireless communication performed by a network node, comprising: receiving an indication of a noise whitening matrix associated with processing of received communications at a user equipment (UE); and transmitting data with precoding that is based at least in part on the noise whitening matrix.

Aspect 12: The method of Aspect 11, wherein the noise whitening matrix is based at least in part on noise estimation of a downlink communication transmitted by the network node before receiving the indication of the noise whitening matrix.

Aspect 13: The method of any of Aspects 11-12, further comprising transmitting a request to provide the noise whitening matrix, wherein receiving the indication of the noise whitening matrix is based at least in part on transmitting the request to provide the noise whitening matrix.

Aspect 14: The method of any of Aspects 11-13, further comprising receiving a refinement matrix associated with a refinement of the precoding.

Aspect 15: The method of Aspect 14, wherein the refinement matrix produces a triangular matrix when multiplied with an equivalent downlink channel response matrix associated with the data at the UE.

Aspect 16: The method of Aspect 15, wherein the equivalent downlink channel response matrix is produced by application of the noise whitening matrix to the data.

Aspect 17: The method of Aspect 14, further comprising: transmitting additional data with additional precoding that is based at least in part on the refinement matrix.

Aspect 18: The method of any of Aspects 11-17, further comprising: receiving a first request to transmit an updated noise whitening matrix; or transmitting a second request to update the noise whitening matrix.

Aspect 19: The method of Aspect 18, wherein receiving the first request or transmitting the second request is based at least in part on one or more of: a change of channel conditions, a change in Doppler metrics, or a change in power or computing resources available to the UE.

Aspect 20: The method of any of Aspects 11-19, wherein the precoding is based at least in part on performing RQ decomposition using an uplink channel estimation and the noise whitening matrix.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "of" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  transmit an indication of a noise whitening matrix associated with processing of received communications, wherein the noise whitening matrix is based at least in part on noise estimation of a downlink communication received before transmitting the indication of the noise whitening matrix; and
  receive data with precoding that is based at least in part on the noise whitening matrix.

2. A user equipment (UE) for wireless communication, comprising:
 a memory, and
 one or more processors, coupled to the memory, configured to:
  transmit an indication of the noise whitening matrix associated with processing of received communications; and
  receive data with precoding that is based at least in part on the noise whitening matrix; and
  wherein the one or more processors are further configured to receive a request to provide the noise whitening matrix, and
  wherein transmitting the indication of the noise whitening matrix is based at least in part on receiving the request to provide the noise whitening matrix.

3. A user equipment (UE) for wireless communication, comprising:
 a memory; and
 one or more processors, coupled to the memory, configured to:
  transmit an indication of a noise whitening matrix associated with processing of received communications;
  receive data with precoding that is based at least in part on the noise whitening matrix; and
  transmit a refinement matrix associated with a refinement of the precoding.

4. The UE of claim 3, wherein the one or more processors are further configured to:
 obtain the refinement matrix based at least in part on identifying the refinement matrix as producing a triangular matrix when multiplied with an equivalent downlink channel response matrix associated with the data.

5. The UE of claim 4, wherein the equivalent downlink channel response matrix is produced by application of the noise whitening matrix to the data.

6. The UE of claim 3, wherein the one or more processors are further configured to:
 receive additional data with additional precoding that is based at least in part on the refinement matrix.

7. The UE of claim 6, wherein the one or more processors are further configured to:
 apply the noise whitening matrix to the additional data; and
 estimate a downlink channel to be used to receive the additional data.

8. A user equipment (UE) for wireless communication, comprising:
 a memory; and
 one or more processors, coupled to the memory, configured to:
  transmit an indication of a noise whitening matrix associated with processing of received communications; and
  receive data with precoding that is based at least in part on the noise whitening matrix; and
  wherein the one or more processors are further configured to:
   receive a first request to transmit an updated noise whitening matrix; or
   transmit a second request to update the noise whitening matrix.

9. The UE of claim 8, wherein receiving the first request or transmitting the second request is based at least in part on one or more of:
a change of channel conditions,
a change in Doppler metrics, or
a change in power or computing resources available to the UE.

10. A network node for wireless communication, comprising:
a memory; and
one or more processors, coupled to the memory, configured to:
receive an indication of a noise whitening matrix associated with processing of received communications at a user equipment (UE), wherein the noise whitening matrix is based at least in part on noise estimation of a downlink communication transmitted by the network node before receiving the indication of the noise whitening matrix; and
transmit data with precoding that is based at least in part on the noise whitening matrix.

11. A network node for wireless communication, comprising:
a memory, and
one or more processors, coupled to the memory, configured to:
receive an indication of a noise whitening matrix associated with processing of received communications at a user equipment (UE); and
transmit data with precoding that is based at least in part on the noise whitening matrix; and
wherein the one or more processors are further configured to transmit a request to provide the noise whitening matrix,
wherein receiving the indication of the noise whitening matrix is based at least in part on transmitting the request to provide the noise whitening matrix.

12. A network node for wireless communication, comprising:
a memory; and
one or more processors, coupled to the memory, configured to:
receive an indication of a noise whitening matrix associated with processing of received communications at a user equipment (UE);
transmit data with precoding that is based at least in part on the noise whitening matrix; and
receive a refinement matrix associated with a refinement of the precoding.

13. The network node of claim 12, wherein the refinement matrix produces a triangular matrix when multiplied with an equivalent downlink channel response matrix associated with the data at the UE.

14. The network node of claim 13, wherein the equivalent downlink channel response matrix is produced by application of the noise whitening matrix to the data.

15. The network node of claim 12, wherein the one or more processors are further configured to:
transmit additional data with additional precoding that is based at least in part on the refinement matrix.

16. A network node for wireless communication, comprising:
a memory, and
one or more processors, coupled to the memory, configured to:
receive an indication of a noise whitening matrix associated with processing of received communications at a user equipment (UE); and
transmit data with precoding that is based at least in part on the noise whitening matrix; and
wherein the one or more processors are further configured to:
receive a first request to transmit an updated noise whitening matrix; or
transmit a second request to update the noise whitening matrix.

17. The network node of claim 16, wherein receiving the first request or transmitting the second request is based at least in part on one or more of:
a change of channel conditions,
a change in Doppler metrics, or
a change in power or computing resources available to the UE.

18. A network node for wireless communication, comprising:
a memory; and
one or more processors, coupled to the memory, configured to:
receive an indication of a noise whitening matrix associated with processing of received communications at a user equipment (UE); and
transmit data with precoding that is based at least in part on the noise whitening matrix, wherein the precoding is based at least in part on performing RQ decomposition using an uplink channel estimation and the noise whitening matrix.

19. A method of wireless communication performed by a user equipment (UE), comprising:
receiving a request to provide a noise whitening matrix,
transmitting an indication of the noise whitening matrix based at least in part on receiving the request to provide the noise whitening matrix, where the noise whitening matrix is associated with processing of received communications; and
receiving data with precoding that is based at least in part on the noise whitening matrix.

20. A method of wireless communication performed by a user equipment (UE), comprising:
transmitting an indication of a noise whitening matrix associated with processing of received communications;
receiving data with precoding that is based at least in part on the noise whitening matrix; and
transmitting a refinement matrix associated with a refinement of the precoding.

21. The method of claim 20, further comprising:
obtaining the refinement matrix based at least in part on identifying the refinement matrix as producing a triangular matrix when multiplied with an equivalent downlink channel response matrix associated with the data.

22. The method of claim 20, further comprising:
receiving additional data with additional precoding that is based at least in part on the refinement matrix.

23. A method of wireless communication performed by a network node, comprising:
transmitting a request to provide a noise whitening matrix;
receiving an indication of the noise whitening matrix based at least in part on transmitting the request to provide the noise whitening matrix, wherein the noise whitening matrix is associated with processing of received communications at a user equipment (UE); and transmitting data with precoding that is based at least in part on the noise whitening matrix.

24. A method of wireless communication performed by a network node, comprising:

receiving an indication of a noise whitening matrix associated with processing of received communications at a user equipment (UE);

transmitting data with precoding that is based at least in part on the noise whitening matrix; and receiving a refinement matrix associated with a refinement of the precoding.

25. The method of claim 24, wherein the refinement matrix produces a triangular matrix when multiplied with an equivalent downlink channel response matrix associated with the data at the UE.

26. The method of claim 24, further comprising:

transmitting additional data with additional precoding that is based at least in part on the refinement matrix.

* * * * *